Patented Oct. 16, 1934

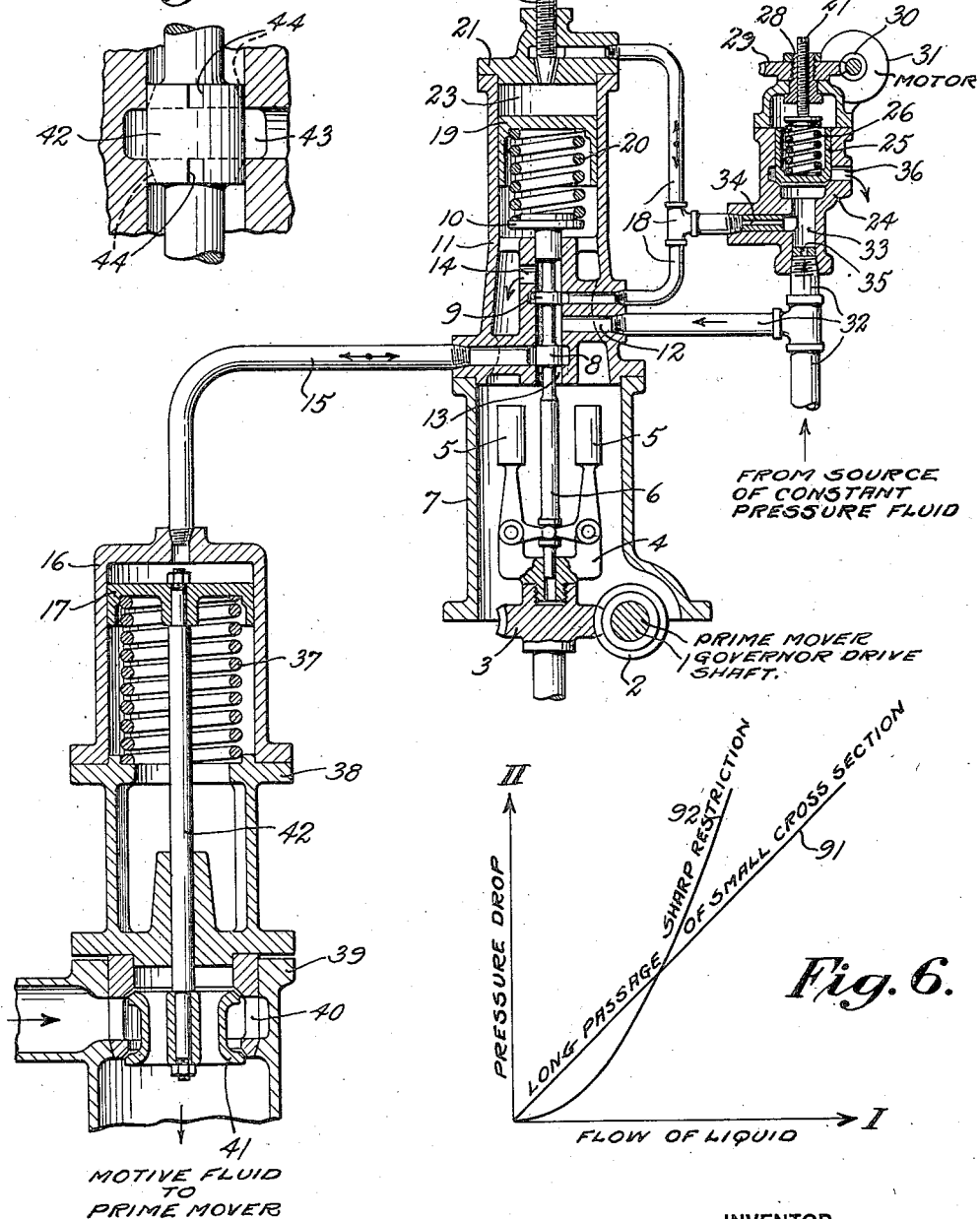

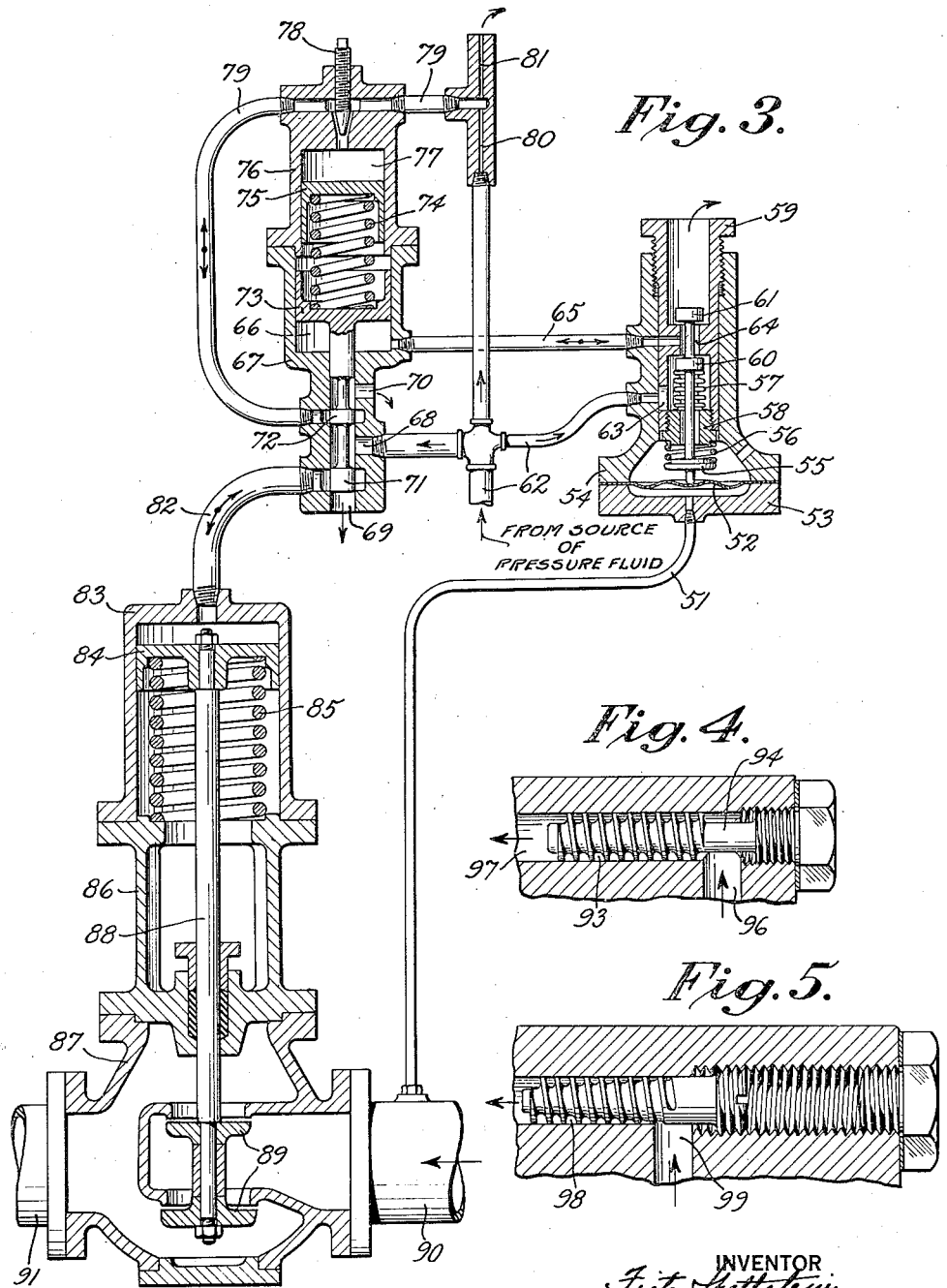

1,976,820

UNITED STATES PATENT OFFICE 1,976,820

PRESSURE LIQUID ACTUATED REGULATOR

Fritz Wettstein, Flushing, N. Y.

Application July 17, 1931, Serial No. 551,377

24 Claims. (Cl. 264—4)

This invention relates to liquid pressure actuated regulators equipped with resilient return motion mechanism, otherwise known as resilient compensating gear, or as isodromic governors in the case of speed control.

One object of my invention is to provide a resilient return motion arrangement of the purely hydraulic type, whereby the governor proper is interconnected with the servomotor by means of a pressure liquid conduit only, without the use of levers and the like as in the case of the commonly used mechanical return motion devices. The advantages of purely hydraulic return motion are simplicity, reliability and accuracy of performance due to the elimination of levers, pivots and the like with their inherent disadvantages of friction, momentum and play. Another advantage of hydraulic return motion is that it provides great flexibility with regard to the mutual arrangement and location of governor and servo motor, the only connection between the same being pressure liquid conduit.

I obtain hydraulic compensation by the provision of an auxiliary pilot valve, working in parallel and moving together with the main pilot valve, and supplying pressure fluid to an auxiliary servo motor. The movement of the auxiliary servo motor is a substantially exact reproduction, on the same or a different scale, of the movement of the main servo motor, and I make use of the movement of the auxiliary servo motor to accomplish compensation.

Another object of my invention is to provide means for adjusting the degree of compensation in wide limits and in such a way that the best possible regulating results may be obtained; that is, a minimum deviation in the regulated condition and a maximum degree of stability. This adjustment may readily take place during operation of the regulator and allows the regulator to be set for the ideal condition known as aperiodic regulation in practically all applications.

Further objects, novel features and advantages of my invention will be apparent as the description proceeds, which is presented with reference to the accompanying drawings forming part of this specification, of which:

Fig. 1 is a sectional view of one embodiment of the invention as applied to a valve controlled by a speed-responsive governor;

Fig. 2 is a sectional view, on an enlarged scale, of a preferred form of auxiliary pilot valve applicable to structure of the character shown in Fig. 1;

Fig. 3 is a sectional view of another embodiment of my invention as applied to a pressure regulator;

Fig. 4 is a sectional view of a preferred form of non-adjustable restriction arrangement;

Fig. 5 is a sectional view of a preferred form of adjustable restriction arrangement; and, Fig. 6 is a diagram explaining the performance of different types of restriction arrangements.

I wish it to be understood that my invention applies to any kind of regulation. By way of example, a speed governor has been chosen in Fig. 1 and a pressure regulator in Fig. 3 to illustrate the invention. However, since my invention refers to the compensation arrangement, it may be applied to any type of regulator or governor responsive to impulses indicating any physical, chemical or electrical condition such as speed, pressure, temperature, voltage and the like.

In Fig. 1, shaft 1 may be the main shaft of a steam turbine. On shaft 1 is mounted worm 2 driving gear wheel 3 connected to pivot support 4. This support carries the two fly weights 5 which, during rotation, tend to move spindle 6 upwards. The above parts, which are contained in casing 7, compose the speed governor, which may be of any known type. The upper part of spindle 6 forms the main pilot valve member 8, the auxiliary pilot valve member 9 and the spring support 10. The pilot valve members move in the lower part of casing 11 containing port 12 for the admission and ports 13 and 14 for the discharge of a motive pressure liquid. The main pilot valve member 8 controls supply and discharge of pressure liquid through conduit 15 to and from the main servo motor composed of cylinder 16 and piston 17. In a similar way the auxiliary pilot valve 9 controls supply and discharge of pressure liquid through conduit 18 to and from the auxiliary servo motor composed of the upper part of casing 11 and of piston 19. Between support 10 and piston 19 is inserted spring 20. Cylinder cover 21 contains a throttling or restriction arrangement with the adjustable restriction member 22 adapted to restrict flow of pressure liquid between chamber 23 above piston 19 and conduit 18. Conduit 18 also connects to a relief valve composed of valve body 24 and valve 25. Valve 25 is pressed down against the pressure in chamber 33 by spring 26 which may be adjusted by means of the threaded spindle 27 rotatable in the threads of the hub 28 which is fastened to gear wheel 29, which in turn is controlled through worm gear 30 from an electric motor 31. Pressure liquid for the operation of the governor is supplied through conduit 32. Between chamber 33 and conduit 18 is inserted restriction 34, and between chamber 33 and supply conduit 32 is inserted restriction 35. Pressure liquid is discharged from the relief valve through port 36.

The main servo motor contains spring 37 and is mounted on the governor valve by means of support 38. The governor valve is composed of casing 39, seat cage 40 and the valve proper 41, which is connected to the servo motor piston 17 by means of valve stem 42.

The mode of operation is as follows:

Assuming first the governor system to be in equilibrium, i. e. pilot valve members 8 and 9 in their closed or neutral position and governor valve 41 at rest in some intermediate position. The centrifugal force on fly weights 5 must then be in balance with the opposing force which is determined by the pressure in chamber 23 and the size of compensation piston 19, the opposing forces being transmitted through spring 20 which is compressed accordingly. Since during equilibrium pressure in chamber 23 is equal to pressure in chamber 33, the centrifugal force of fly weights 5 during equilibrium is balanced by the pressure determined and maintained constant by relief valve 25. This pressure determines the speed at which the governor is at rest, and by changing the tension on spring 26 of relief valve 25, the governor may be adjusted for different speeds. The adjustment of relief valve 25 may be accomplished in any known manner, for example by screw drive 27 and 28 through worm drive 29 and 30 by an electric motor 31, so that the speed of the turbine may be controlled in the usual way from the operating switch board. Preferably the size of orifice 35 and the tension of spring 26 are such that at normal turbine speed the pressure maintained in chamber 33, through which there is a continuous flow of fluid to outlet 36, is approximately one-half that of the pressure in the supply conduit 32.

Assume now the speed of the turbine to increase above the value for which the governor is set, due to a decrease in the load. If we further assume that the decrease in load and the increase in speed occurs suddenly or at a comparatively rapid rate, the auxiliary piston 19 remains practically at rest at the first moment, while fly weights 5 move pilot valve members 8 and 9 upward by an amount determined by the increase in speed and the compression in spring 20.

The upward movement of the pilot valve members on the one hand allows pressure liquid to be relieved from servo motor 16 through conduit 15 past pilot valve 8 and through port 13 to the atmosphere. Servo motor piston 17 and main valve 41 are forced upward by spring 37, resulting in a reduction of the steam flow to the turbine, as is called for by the increased speed.

On the other hand, auxiliary pilot valve 9 admits pressure fluid from supply conduit 12 to conduit system 18. Restriction 22 may for the present be assumed wide open. Since restriction 34 always tends to restrict flow of liquid, the supply of pressure liquid to conduit 18 at the first moment forces auxiliary piston 19 downward, thus compressing spring 20 and tending to return pilot valve members 8 and 9 towards their neutral position, in opposition to the force exerted by the speed governor. As soon as pilot valve member 9 has returned to its neutral position, pressure in chamber 23 ceases to increase and the increased force of the fly weights 5 under the increased speed is in balance with the increased pressure in chamber 23 and conduit 18, and it would at first appear that a new state of equilibrium has been reached. However, since pressure in space 23 and conduit 18 now is higher than in space 33 of the relief valve, pressure liquid gradually flows from space 23 through conduit 18 and restriction 34, thus allowing auxiliary piston 19 and pilot valve members 8 and 9 again to move upwards under the action of the governor. This causes again a check on the upward movement of the pilot valves due to pressure liquid being admitted by the auxiliary pilot valve 9 to the auxiliary piston 19. On the other hand, pilot valve 8 allows a further closing movement of the main governor valve 41, resulting now in a decrease of the speed of the turbine.

The above described interplay of the governor mechanisms evidently continues until pressure in space 23 is again equal to the constant pressure maintained by the relief valve 25 in chamber 33. The new condition of equilibrium is characterized by the fact that the speed of the turbine has returned to exactly the same value as prior to the change of load, and that the main governor valve 41 is now more closed by an amount corresponding to the decrease of the load of the turbine. These are the characteristics of isodromic speed governor mechanisms.

While the dynamic properties of the above described resilient compensation gear theoretically, i. e. not considering the effects of momentum of governor parts, friction and the like, exactly correspond to those of the well known form of mechanical resilient return motion, there is a distinct difference in the design of my hydraulic compensation gear as compared with the mechanical form. In order to convey a clear picture and to bring out the characteristic features of my new form of resilient hydraulic return motion, I wish to give herewith another and somewhat more extended description of its function. For a clear understanding of the process of regulation it is convenient to assume that the same takes place in two distinctly separate periods:

For the first period it may be assumed that restriction 34 is entirely closed. This assumption nearly corresponds to actual conditions when the change in load and speed occur quickly, so that at the first moment the flow of pressure liquid through restriction 34 may be neglected. Assuming again pilot valve members 8 and 9 to move upward by a certain amount due to a certain increase in speed, pressure liquid is relieved from main servo motor 16 by pilot valve 8, and, on the other hand, pressure liquid at higher pressure is admitted by pilot valve 9 from supply conduit 32 to space 23 above auxiliary piston 19. The mean pressures in servo motor 16 and in space 23 of the auxiliary motor are preferably equal to about half of the pressure in the supply conduit 32. Consequently the pressure drops through both pilot valves are about equal, and since further the movements of the pilot valves both as to their extent and to the time factor are exactly alike, the amounts of pressure liquid passing through the two pilot valves in equal periods are equal or proportionate to each other. The amounts are equal if the two pilot valves are of equal size as indicated in Fig. 1. If it is desired to obtain different amounts of pressure liquid, this may obviously be accomplished by providing pilot valves of different diameters, or by using the same diameter and providing restrictions at one or both pilot valves in any known manner, for example as shown in Fig. 2. Referring to this figure, the pilot valve member 42 extends beyond the edges of port 43 and is provided with a number of slots 44, ending flush with the edges of port 43. By properly selecting the number and width of slots 44, any desired flow of pressure liquid may be obtained for a certain opening of the pilot valve.

The law of proportionality of flow between the flow of pressure liquid through the servo motor pilot valve 8 and through the auxiliary pilot valve 9 is of basic importance in the action of my compensation gear. Due to this proportionality of flow, the movement of the auxiliary servo motor element 19 is substantially an exact reproduction in the same or a different scale of the movement of servo motor 17, during the first period of operation, when restriction 34 may be assumed to be closed. The movement of the auxiliary motor 19 may then be utilized in any known manner to accomplish compensation or return motion. I prefer to accomplish this return motion by letting auxiliary motor 19 act directly through spring 20 on pilot valve members 8 and 9, so as to return the same towards their neutral position against the action of the speed governor.

As long as restriction 34 is assumed closed, my compensation arrangement acts exactly as a so-called rigid compensation, whereby a definite speed corresponds to each position of the servo motor. In my case, this relation is determined by the proportionate flow of pressure liquid to the main servo motor and to the auxiliary motor, resulting in a definite compression of spring 20 for each position of servo motor 17, which in turn calls for a definite speed of the governor in order to obtain equilibrium. During this first period of rigid return motion, the speed of the turbine increases and the governor valve 41 closes by a corresponding amount.

At this moment, the second period may be assumed to start. Restriction 34 is now no longer assumed to be closed and allows pressure liquid from space 23 gradually to pass to relief valve 25, until pressure in space 23 becomes equal to pressure in space 33. The decrease in pressure in space 23 causes the main governor valve 41 to close a little more, until the speed of the turbine reaches again the value for which the governor is set, and at which the turbine was running prior to the occurrence of the load change. While the first period represents rigid return motion and serves to establish stability of regulation, the second period represents the resilient feature and serves to reestablish the exact condition for which the governor is set.

Actually, these two distinct periods do not exist as the respective movements take place substantially simultaneously. However, as mentioned above, the assumption of the two separate periods is advantageous and convenient for a clear understanding of the various functions.

Having now described the operation of the governor, I wish to explain the function of the adjustable restriction 22, which serves to adjust the governor for different degrees of stability or different degrees of compensation to meet different operating conditions.

For a clear understanding of the function and the value of the adjustment made possible by restriction 22, it is necessary to understand the dynamics of indirect resilient regulation. Since the points here of importance apparently never have been clearly set out in the technical literature, I wish to give herewith a short survey of the most important of the factors and relations which are involved. I refer particularly to the type of hydraulic resilient return motion embraced in the present invention. At the same time, the results of an accurate mathematical analysis of my invention are presented in the form of a few simple formulæ, which render it possible to calculate and design my novel type of return motion so as to obtain the best possible results.

The performance of the governor is completely determined by the following characteristics:

1st. Starting time $T_s$ of the turbine, which is a given constant for each turbine and represents the time required for the turbine to reach full speed from rest under the application of the normal torque.

2nd. Closing time $T_c$ of the main governor valve, which is the time required by the main valve or the main servo motor to travel its full stroke.

3rd. Main pilot valve deviation $d_p$, which is the change in speed required for the governor to move the main pilot valve its full stroke.

4th. Main servo motor speed deviation $d_s$, which is the change in speed of the governor corresponding to the full travel of the main servo motor, assuming rigid return motion, that is, restriction 34 closed.

5th. Closing time $T_1$ of the auxiliary servo motor 19 for full stroke, assuming auxiliary pilot valve 9 fully open, restriction 34 closed and restriction 22 wide open. By this, I mean the stroke required to return the pilot valves from their extreme to their neutral positions, with full stroke of auxiliary servo-motor 19.

6th. Closing time $T_2$ of auxiliary servo motor 19 for full stroke under the action of spring 20, assuming restriction 22 wide open, pilot valve 9 closed and restriction 34 effective.

7th. Closing time $T_3$ of auxiliary servo motor 19 for full stroke under the action of spring 20, assuming pilot valve 9 and restriction 34 wide open and restriction 22 effective.

The most desirable form of regulation is that represented by the limit of aperiodic regulation, characterized by one single oscillation of minimum amplitude. From the differential equations of the process of regulation I find that this type of regulation is obtained when the above determined characteristics and constants satisfy the following two equations:

$$T_2 = 9T_1 \text{ and } 27 d_p T_c T_s = (T_2 + T_3)^2$$

The first of the two equations states that the movement of auxiliary servo motor 19 under the action of spring 20 and restriction 34 must be 9 times slower than under the action of full open pilot valve 9. This confirms a previous statement that the equalizing action through restriction 34 must be comparatively slow, so that as a first approximation, restriction 34 during the first period of regulation, may be assumed closed.

The second equation is a measure of the degree of stability which may be obtained. The larger the left side of the equation as compared with the right side, the larger is the stability of the governor system. The ideal case of aperiodic regulation with minimum amplitude is obtained when the two sides are equal. The maximum amplitude obtained for this specific case for a sudden, maximum load change, is equal to:

$$A = 1.46 \frac{d_p T_c}{T_s}$$

This equation shows that the amplitude is smaller the larger the starting time $T_s$ of the turbine and the smaller the pilot valve deviation $d_p$ and the main servo motor closing time $T_c$. Since $T_s$ is a given constant of the turbine, it is desirable to make $d_p$ and $T_c$ as small as possible, which means that the governor valve should work as quickly as possible.

Going back to the second equation, the same shows that the stability increases with increasing pilot valve deviation $d_p$, servo motor closing time $T_c$ and starting time $T_s$. However, since according to the above, $d_p$ and $T_c$ must be kept as small as possible, it is evident that for best results the remaining time constants on the right side of the equation must be properly selected, that is they must be chosen sufficiently small to satisfy the equation. In view further of the first equation, it is evident that the three time constants $T_1$, $T_2$ and $T_3$ must be chosen comparatively small if a high degree of stability is to be obtained. In other words, auxiliary pilot valve 9 must be comparatively large so that the auxiliary piston 19 quickly returns pilot valve 8 to its neutral position, thus checking the movement of main servo motor 17 after the same has traveled a comparatively small distance. In this way, over regulation is prevented and a high degree of stability is obtained.

The fact that the movement of main servo motor 17 is quickly checked does not mean that the resulting process of regulation is slow. As explained above, all of the auxiliary servo motor time constants, including $T_2$, are preferably made small. Restoration 34 therefore allows auxiliary servo motor 19 to return to its normal position comparatively quickly, so that the speed governor again may open the pilot valves and cause further movement of the main servo motor until the change in load is met by a corresponding change in the opening of the governor valve. Obviously, the process of regulation and compensation may occur quickly without endangering stability. This combination of high speed of regulation, ensuring small amplitudes, together with a high degree of stability, is one of the main advantages of my invention.

It is also clear now, how the adjustable restriction 22, which determines the constant $T_3$, may be used to adapt the governor to different operating conditions. As explained above, the governor may be adjusted to operate with stability under any operating condition by the proper selection of the auxiliary servo motor time constants $T_1$, $T_2$, and $T_3$. The constant $T_1$, and, through the first equation also $T_2$, is determined by the size of the auxiliary pilot valve 9, and is therefore not adjustable. I prefer to choose $T_1$ and $T_2$ so small that sufficient stability is obtained for the smallest value of the starting time $T_s$ which the governor may be expected to meet. In this case, restriction 22 is wide open, allowing the maximum amount of compensation to take place. The governor may then readily be adjusted for larger values of the starting time $T_s$ by increasing restriction 22, thus making $T_3$ larger. This evidently is the equivalent of increasing $T_1$ and $T_2$ accordingly, that is of eliminating part of the compensation action. Further, since $T_3$ in the second of the above equations appears in the second power, a small adjustment of restriction 22 has a marked effect on the stability of regulation, so that the governor may be adjusted readily for a wide range of requirements.

The mechanical significance of an adjustment of restriction 22 becomes apparent from a consideration of the equation for the main servo motor speed deviation:

$$d_s = \frac{8T_c d_p}{T_2 + T_3}$$

This equation applies to rigid return motion, that is restriction 34 closed. It shows that an adjustment of restriction 22, i. e. a change of the time constant $T_3$, means a change of the main servo motor speed deviation $d_s$. By decreasing $T_3$, i. e. by opening 22, the main servo motor deviation $d_s$ becomes larger. It is a well known fact that a large servo motor deviation $d_s$ increases the stability of regulation and I make use of this fact by means of the adjustable restriction 22. At the same time, I prefer to maintain the pilot valve deviation $d_p$ as small as possible, thus ensuring quick regulation, and to establish the required degree of stability by increasing the servo motor deviation $d_s$.

To make the same adjustment on a governor equipped with mechanical return motion, it would be necessary to change the ratio of levers on the return motion lever, which evidently would be a difficult thing to accomplish, requiring a complicated mechanical mechanism. It is one of the main advantages of my invention, that this valuable adjustment is provided through the means of a simple throttling or restriction arrangement.

Fig. 3 shows my invention as applied to a pressure governor, in this case an excess pressure governor. The regulating pressure impulse is transmitted through conduit 51 to an elastic pressure diaphragm 52, inserted between cover 53 and casing 54. The diaphragm 52 actuates member 55, which is pressed against diaphragm 52 and held in position by spring 56 and bellows 57, both of which are secured on part 58, which in turn is screwed tight into sleeve 59. To the upper part of movable member 55 are fastened two valves or valve heads 60 and 61, forming together with the central part of sleeve 59 a double acting, balanced control valve. Sleeve 59 is movable in casing 54 and its position may be adjusted by means of threads provided at its upper end. The entire mechanism contained in casing 54 I term the impulse receiver. It is supplied with pressure liquid from conduit system 62 through port 63. Pressure in the space adjoining port 63 is balanced as the diameter of bellows 57 and valve 60 are of equal size. Space 64 between valves 60 and 61 through conduit 65 communicates with chamber 66 in casing 67. The lower part of this casing contains admission port 68, relief ports 69 and 70 and the necessary ports for main pilot valve member 71 and auxiliary pilot valve member 72. These pilot valves are in one piece with amplifier servo motor piston 73, which, by means of compression spring 74 is in connection with auxiliary servo motor piston 75 in cylinder 76. Chamber 77 in cylinder 76, by means of the adjustable restriction 78 communicates with conduit system 79, which in turn communicates with auxiliary pilot valve 72, further, through restriction 80, with the supply conduit 62, and through restriction 81 with the atmosphere. The main pilot valve 71 controls the supply and discharge of pressure liquid through conduit 82 to and from the main servo motor, composed of cylinder 83, piston 84 and spring 85. The main servo motor cylinder 83 rests on support 86 and valve casing 87. The main servo motor piston 84, by means of stem 88, actuates the double seated valve 89, which controls the flow of a fluid such as for example steam from the admission conduit 90 to the outlet conduit 91.

The mode of operation is as follows:

Assuming first the main control valve 89 to be in equilibrium in some intermediate position, the servo motor pilot valve member 71 necessarily must be in its neutral position. Further, pressure in chamber 66 must be balanced by pressure in chamber 77. During equilibrium, the pressure in chamber 77 is determined by the pressure in the supply conduit 62 and the size of restrictions 80 and 81. I prefer to make restrictions 80 and 81 of equal size, so that during equilibrium the pressure in chamber 77 is equal to half of the pressure in the supply conduit 62. I further prefer to make the effective area of auxiliary servo motor piston 75 equal to that of amplifier servo motor piston 73, so that for equilibrium, pressure in chamber 66 also must be equal to half of the pressure in supply conduit 62. For equilibrium, throttle valves 60 and 61 must therefore be open by an equal amount, as otherwise pressure in chambers 64 and 66 would not be equal to half of the supply pressure. Equilibrium can therefore only exist for one definite position of valves 60 and 61, and consequently only for one definite value of the regulated steam pressure at the admission 90 of the main valve. This pressure may readily be adjusted by screwing sleeve 59 towards or away from diaphragm 52.

Assuming now that the regulated pressure at the main valve admission 90 increases, this causes diaphragm 52 to deflect upwardly, closing valve 60 and opening valve 61 by a certain amount. Pressure in chamber 64 and 66 decreases somewhat and amplifier piston 73 moves downwardly by a certain amount under the action of spring 74.

This causes on the one hand main pilot valve 71 to admit pressure fluid to the main servo motor piston 84, opening main valve 89 wider and relieving the excess pressure from the valve inlet conduit 90.

On the other hand, auxiliary pilot valve 72 relieves pressure from conduit 79 and chamber 77, so that auxiliary servo motor piston 75 moves upwardly and allows pilot valve members 71 and 72 to return towards their neutral position.

At the same time, equalizing action takes place due to the fact that restrictions 80 and 81 tend to reestablish the normal pressure in conduit 79 and chamber 77. The action of pilot valves 71 and 72 is then repeated as described before and the process of regulation is completed when the original pressure in the main valve admission line 90 is reestablished and the main valve 89 has opened by an amount corresponding to the increased steam flow.

It will be evident that the action of the resilient return motion is exactly like that in the case of the governor shown in Fig. 1, so that further explanation appears unnecessary.

The throttling or restricting arrangement 78 of Fig. 3 has the same function as restriction 22 of Fig. 1, namely to adapt the governor to different operating conditions. This is particularly valuable in the case of pressure control, where the starting time or filling time $T_s$ of the regulated steam or pressure main is different in practically every application. Further, while the starting time $T_s$ for the speed control of steam turbines is about 10 seconds, in the case of pressure control of steam mains and the like, it is often only a fraction of one second. I prefer therefore to make the auxiliary servo motor closing time $T_1$ small compared to the main servo motor closing time $T_s$, so as to obtain a powerful compensation. In this way, I also obtain a high degree of stability in pressure control, where the problem of stability is often very difficult to solve due to the short starting time $T_s$.

Another advantage of the pressure regulator shown in Fig. 3 is that pressure changes within reasonable limits in the motive liquid supply conduit 62 do not affect the operation of the regulator, nor do they change the accurate value of the pressure for which the regulator is set to work. This is due to the fact that a change in the pressure in supply conduit 62 causes equal changes of pressure in chambers 66 and 77, so that the balance on pistons 73 and 75 is not disturbed.

I wish it to be understood that the regulator shown in Fig. 3, while here shown as adapted to the control of pressure, may be used for the control of any other condition. To this end, diaphragm 52 would be replaced by means indicating the condition which is to be regulated, and valve 89 may be replaced by some other suitable control means.

Fig. 4 shows a preferred form of the restriction arrangements 34 of Fig. 1 and 80 and 81 of Fig. 3. It is of importance for the best operation of my invention, that proportionality exists between the fluid flow through these restrictions and the resulting pressure drop, as shown by the straight line curve 91 in the diagram of Fig. 6. In this diagram, the pressure drop is plotted as ordinate II against the flow of liquid as abscissa I. It is known that a sharp restriction, such as an orifice, produces a throttling effect following an exponential law, such as represented by curve 92 in Fig. 6, whereas liquid flow and pressure drop through a narrow passage, as shown at the restriction member 78 of Fig. 3, or through a capillary tube as shown at 80 and 81 of Fig. 3, follow the straight line law of curve 91. Restrictions having the general characteristic of curve 92, are undesirable for my purpose. They would work satisfactorily only at the point of intersection of curves 91 and 92, while for smaller flows, their resistance would be too small, and for larger flows it would be too large.

My preferred form of restriction shown in Fig. 4, is a capillary channel 93, arranged in the form of a spiral, similar to screw threads, on pin 94, which fits closely in a bore of casing 95 having an inlet at 96 and an outlet at 97. The advantages of this arrangement include, the possibility of providing a longer channel than could conveniently be obtained by drilling a hole of equally small diameter, reduced space requirement as compared with a straight channel of equal length, minimum possibility for clogging as compared with equivalent restrictions of different cross section, and accessibility for inspection and cleaning by removing pin 94.

Fig. 5 shows a preferred form of adjustable restriction arrangement 22 of Fig. 1 and 78 of Fig. 3. This restriction arrangement is similar in construction to the one shown in Fig. 4, the difference being that the spiral throttling channel 98 is of gradually decreasing cross section toward the inlet port 99. This construction allows for a wide range of adjustment of the throttling effect, at the same time preserving the advantages described with regard to the arrangement shown in Fig. 4.

While my invention has been described with reference to two different embodiments, it is obvious that the same principle may be applied in many different ways. Any known type of regulator transmitting the regulating impulse to the pilot valves, and any known type of pilot valve arrangement and servo motor may be used instead of the forms described in the foregoing.

What I claim is:

1. In a pressure liquid actuated regulator including a servo motor and a relay controlling flow of pressure fluid actuating said servo motor, means providing a space for static liquid pressure, means for determining a static liquid pressure change in said space comprising means for establishing a first liquid flow substantially proportionate to the liquid flow to said servo motor and means for establishing a second liquid flow substantially proportionate to said static liquid pressure change, and means for effecting compensation of said relay due to said static liquid pressure change.

2. In a pressure liquid actuated regulator, means for effecting a first liquid flow by that which is to be regulated, means for effecting regulation due to said first liquid flow, means providing a space for static liquid pressure, means for effecting a static liquid pressure change in said space comprising means for effecting a second liquid flow by that which is to be regulated and means for effecting a third liquid flow substantially proportionate to said static liquid pressure change, and means for effecting compensation of said first liquid flow and said second liquid flow due to said static liquid pressure change.

3. In a pressure liquid actuated regulator, an element movable under the influence of that which is to be controlled, means for defining a first liquid flow due to movement of said element, means for effecting regulation due to said first liquid flow, means providing a space for static liquid pressure, means for effecting a static liquid pressure change in said space comprising means for defining a second liquid flow due to movement of said element and means for defining a third liquid flow substantially proportionate to said static liquid pressure change, and means for effecting compensation of the movement of said element due to said static liquid pressure change.

4. In a pressure liquid actuated regulator, an element movable under the influence of that which is to be controlled, means for defining a first liquid flow due to movement of said element, means for effecting regulation due to said first liquid flow, means providing a space for static liquid pressure, means for effecting a static liquid pressure change in said space comprising means for defining a second liquid flow substantially proportionate to said first liquid flow due to movement of said element and means for defining a third liquid flow substantially proportionate to said static liquid pressure change, and means for reversing the movement of said element due to said static liquid pressure change.

5. In a pressure liquid actuated regulator, means for producing a first force by that which is to be controlled, an element movable under the influence of said first force, means for defining a first liquid flow due to movement of said element, means for effecting regulation due to said first liquid flow, means providing a space for static liquid pressure, means for effecting a static liquid pressure change in said space comprising means for defining a second liquid flow due to movement of said element and means for defining a third liquid flow substantially proportionate to said static liquid pressure change, and means for causing a second force the value of which is determined by said liquid pressure change to oppose said first force to balance it.

6. A regulator including a pressure liquid actuated main servo motor movable to effect control of that which is to be regulated, a main pilot valve, a conduit connecting said main pilot valve with said main servo motor, said pilot valve controlling flow through said conduit, an auxiliary servo motor, an auxiliary pilot valve, a conduit connecting said auxiliary pilot valve with said auxiliary servo motor, said auxiliary pilot valve controlling flow through the second mentioned conduit, said auxiliary pilot valve being controlled by said main pilot valve to cause the flow through the second mentioned conduit to be substantially proportionate to the flow through the first mentioned conduit, a source of constant liquid pressure, a conduit connecting said source of constant pressure with said auxiliary servo motor, means for creating flow in said conduit proportionate to the pressure difference between said source and said auxiliary servo motor, and resilient means for influencing movement of said main pilot valve in accordance with movement of said auxiliary servo motor.

7. Regulator apparatus including a pressure liquid actuated main servo motor movable to effect control of that which is to be regulated, a main pilot valve for controlling said main servo motor, an auxiliary servo motor comprising a space for pressure fluid and an element movable in response to variations in the static pressure of fluid in said space, a source of pressure fluid, means for admitting pressure fluid to said space comprising an auxiliary pilot valve for controlling flow to and from said space, regulating means responsive to a regulating impulse and actuating said main and said auxiliary pilot valves, a restriction and a relief valve for maintaining a constant liquid pressure due to flow of pressure liquid from said source, a restricted connection between said relief valve and said auxiliary servo motor for obtaining a gradual equalization between the static pressure in said space and said constant liquid pressure, and resilient means for transmitting motion from said movable element to said main and auxiliary pilot valves in opposition to the regulating impulse.

8. A regulator comprising a pressure liquid actuated main servo motor movable to effect control of that which is to be regulated, a main pilot valve for controlling said main servo motor, an auxiliary servo motor having a space for pressure liquid and an element movable in response to variations in the static liquid pressure in said space, a source of pressure liquid of substantially constant pressure, means including an auxiliary pilot vlave for controlling flow of pressure liquid to and from said space to vary the static pressure therein, said means including a first restriction for restricting flow from said source to said space, regulating means responsive to a regulating impulse from that which is to be regulated for actuating said main and said auxiliary pilot valves, means including a second restriction for allowing a restricted flow of pressure liquid from said space to the atmosphere, and resilient means for transmitting movement from said movable element of the auxiliary servo motor to said main and auxiliary pilot valves in opposition to said regulating impulse.

9. A pressure liquid actuated regulator including a source of substantially constant liquid pressure, a main servo motor movable to effect control of that which is to be regulated, regulating means responsive to the regulated condition, a balanced double acting control valve actuated by said regulating means and increasing flow from said source to a first pressure system and decreasing flow from said first pressure system to the atmosphere upon a change in the regulated condition, an amplifier servo motor responsive to said first pressure, an auxiliary pilot valve actuated by said amplifier servo motor and controlling a second pressure system, a first restriction allowing a restricted flow from said source to said second pressure system, a second restriction allowing a restricted flow from said second pressure system to the atmosphere, an auxiliary servo motor responsive to said second pressure, a main pilot valve actuated by said amplifier servo motor and controlling the main servo motor, and resilient means whereby said auxiliary servo motor acts on said amplifier servo motor in opposition to said first pressure.

10. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo-motor, an auxiliary servo motor having a space for pressure fluid and an element movable under the influence of variations in static fluid pressure in said space, means providing two paths of flow for pressure fluid in communication with said space, one of said paths of flow placing said space in restricted communication with a zone of lower pressure than that of said source, an auxiliary pilot valve for admitting pressure fluid to and releasing pressure fluid from the other of said paths, and means for effecting return or compensating motion of said pilot valves due to movement of the movable element of said auxiliary servo-motor.

11. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, means providing two paths of flow for pressure fluid in communication with said space, one of said paths of flow placing said space in restricted communication with a zone of lower pressure than that of said source, an auxiliary pilot valve for admitting pressure fluid to and releasing pressure fluid from the other of said paths, adjustable means for controlling the rate of flow of pressure fluid between said space and said paths of flow, and means for effecting return or compensating motion of said pilot valves due to movement of the movable element of said auxiliary servo motor.

12. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, means providing two paths of flow for pressure fluid in communication with said space, one of said paths of flow placing said space in restricted communication with a zone of lower pressure than that of said source, an auxiliary pilot valve for admitting pressure fluid to and releasing pressure fluid from the other of said paths, adjustable means for controlling the rate of flow of pressure fluid between said space and said paths of flow, adjustable means for controlling the value of the pressure of said zone of lower pressure, and means for effecting return or compensating motion of said pilot valves due to movement of the movable element of said auxiliary servo motor.

13. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, means providing two paths of flow for pressure fluid in communication with said space, one of said paths of flow placing said space in restricted communication with a zone of lower pressure than that of said source, an auxiliary pilot valve for admitting pressure fluid to and releasing pressure fluid from the other of said paths, and resilient means for effecting return or compensating motion of said pilot valves due to movement of the movable element of said auxiliary servo motor.

14. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, means providing two paths of flow for pressure fluid in communication with said space, one of said paths of flow placing said space in restricted communication with a zone of lower pressure than that of said source, an auxiliary pilot valve arranged to admit pressure fluid to and to release pressure fluid from the other of said paths of flow at a rate varying substantially in proportion to the amount of movement of said main servo motor, resilient means for effecting return or compensating motion, and means for effecting return or compensating motion of said pilot valves due to movement of the movable element of said auxiliary servo motor.

15. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo motor, an auxliary servo motor having a space for pressure fluid and an element movable under the influence of variations in static fluid pressure in said space, means providing two paths of flow for pressure fluid in communication with said space, one of said paths of flow placing said space in restricted communication with a zone of lower pressure than that of said source, an auxiliary pilot valve connected to said main pilot valve and adapted to admit pressure fluid to and to release pressure fluid from the other of said paths of flow at a rate varying substantially in proportion to the rate of flow through said main pilot valve, and resilient means for effecting return or compensating motion of said pilot valves due to movement of the movable element of said auxiliary servo motor.

16. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, means for supplying pressure fluid to and releasing pressure fluid from said space including an auxiliary pilot valve and means tending to maintain the static fluid pressure in said space at a constant value, means responsive to said regulating impulse for actuating said main and auxiliary pilot valves, and means for effecting return or compensating movement of said pilot valves due to movement of the movable element of said auxiliary servo motor.

17. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, means for supplying pressure fluid to and releasing pressure fluid from said space including an auxiliary pilot valve and means tending to maintain the static fluid pressure in said space at a constant value, means responsive to said regulating impulse for actuating said main and auxiliary pilot valves so as to obtain substantially proportionate flow of pressure fluid from said source to said servo motor and to said space, and resilient means for effecting return or compensating movement of said pilot valves due to movement of the movable element of said auxiliary servo motor.

18. Regulating apparatus comprising a main servo motor movable to effect control of that which is to be regulated, a source of pressure fluid, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, an auxiliary pilot valve connected to said main pilot valve and movable therewith, a conduit controlled by said auxiliary pilot valve for supplying pressure fluid to and releasing pressure fluid from said space, a conduit for placing said space in restricted communication with a zone of substantially constant pressure of lower value than the pressure from said source, and a spring for transmitting movement of the movable element of said auxiliary servo motor to said main and auxiliary pilot valves.

19. Regulating apparatus comprising a main servo motor movable to effect control of that which is to be regulated, a source of pressure fluid, means providing a path for continuous flow of pressure fluid from said source to atmosphere when said apparatus is in equilibrium, said path providing a zone of intermediate and substantially constant fluid pressure due to said flow, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, a conduit for supplying pressure fluid to and releasing pressure fluid from said space, an auxiliary pilot valve connected to and movable with said main pilot valve for controlling flow of pressure fluid from said conduit, a conduit in communication with the first mentioned conduit for placing said space in restricted communication with said zone of intermediate pressure, and a spring between the movable element of said auxiliary servo motor and said main and auxiliary pilot valves for effecting return or compensating movement of the pilot valves due to variations in pressure in said space.

20. Regulating apparatus comprising a main servo motor movable to effect control of that which is to be regulated, a source of pressure fluid, means providing a path for continuous flow of pressure fluid from said source to atmosphere when said apparatus is in equilibrium, said path providing a zone of intermediate and substantially constant fluid pressure due to said flow, adjustable means for controlling the value of said intermediate pressure, a main pilot valve movable in response to a regulating impulse from that which is to be regulated for controlling flow of pressure fluid to and from said main servo motor, an auxiliary servo motor having a space for pressure fluid and an element movable under the influence of variations in static fluid pressure in said space, a conduit for supplying pressure fluid to and releasing pressure fluid from said space, an auxiliary pilot valve connected to and movable with said main pilot valve for controlling flow of pressure fluid through said conduit, a conduit in communication with the first mentioned conduit for placing said space in restricted communication with said zone of intermediate pressure, and a spring between the movable element of said auxiliary servo motor and said main and auxiliary pilot valves for effecting return or compensating movement of the pilot valves due to variations in pressure in said space.

21. Regulating apparatus comprising a main servo motor movable to effect control of that which is to be regulated, a source of pressure fluid, a main pilot valve for controlling flow of pressure fluid to and from said main servo motor, an auxiliary pilot valve connected to and movable with said main pilot valve for controlling flow of pressure fluid from said source, an amplifier servo motor element for actuating said pilot valves, means providing a path for continuous flow of pressure fluid from said source to atmosphere when said apparatus is in equilibrium, said path providing a zone of intermediate fluid pressure due to said flow, means responsive to a regulating impulse from that which is to be controlled for varying the pressure of said zone of intermediate pressure, a conduit for conducting pressure fluid from said zone of intermediate pressure to said element, an auxiliary servo motor having a movable element, a spring interposed between the movable elements of the amplifier servo motor and the auxiliary servo motor, a conduit controlled by said auxiliary pilot valve for conducting pressure fluid to the movable element of the auxiliary servo motor, and a conduit placing the movable element of the auxiliary servo motor in restricted communication with the atmosphere.

22. In a pressure fluid actuated regulator, an auxiliary or return motion servo motor comprising a space for pressure fluid and an element movable in response to variations in static liquid pressure in said space, means including a pilot valve influenced by movement of said element for admitting pressure fluid to said space to provide static fluid pressure therein, and means tending to maintain said static fluid pressure at a constant value comprising a conduit providing communication between said space and a zone of relatively low and constant pressure, said conduit having a restriction therein of relatively great length and of relatively small cross sectional area to provide flow through said conduit at a rate substantially directly proportional to the difference in pressure between the ends of said restriction.

23. In a pressure fluid actuated regulator, an auxiliary or return motion servo motor comprising a space for pressure fluid and an element movable in response to variations in static liquid pressure in said space, means including a pilot valve influenced by movement of said element for admitting pressure fluid to said space to provide static fluid pressure therein, means tending to maintain said static fluid pressure at a constant value comprising a conduit providing communication between said space and a zone of relatively low and constant pressure, and flow restricting means in said conduit comprising a pin having a helical groove, said pin contacting the inner surface of said conduit at adjacent portions of said groove and the cross sectional area of the groove as compared with its length being such that flow of liquid through said restriction is directly proportional to the difference in pressure in the conduit on the two opposite sides of said restriction.

24. In a pressure fluid actuated regulator, an auxiliary or return motion servo motor comprising a space for pressure fluid and an element movable in response to variations in static liquid pressure in said space, means including a pilot valve influenced by movement of said element for admitting pressure fluid to said space to provide static fluid pressure therein, means tending to maintain said static fluid pressure at a constant value comprising a conduit providing communication between said space and a zone of relatively low and constant pressure, and adjustable flow restricting means in said conduit comprising a pin having a helical groove, said pin contacting the inner surface of said conduit at adjacent portions of said groove and the cross sectional area of the groove being variable and the length of the groove with respect to its average cross sectional area being sufficient to cause liquid to flow through the groove at a rate proportional to the pressure difference between the ends of the passage.

FRITZ WETTSTEIN.